(12) United States Patent
Camisa

(10) Patent No.: US 7,563,302 B2
(45) Date of Patent: Jul. 21, 2009

(54) APPARATUS AND METHOD FOR MANURE RECLAMATION

(75) Inventor: Timothy Camisa, Colchester, VT (US)

(73) Assignee: Vermont Organics Reclamation Inc, Williston, VT (US)

( * ) Notice: Subject to any disclaimer, the term of this patent is extended or adjusted under 35 U.S.C. 154(b) by 632 days.

(21) Appl. No.: 11/151,770

(22) Filed: Jun. 14, 2005

(65) Prior Publication Data

US 2006/0283221 A1 Dec. 21, 2006

(51) Int. Cl.
*B01D 17/06* (2006.01)
*C05F 3/00* (2006.01)

(52) U.S. Cl. .................. 71/21; 71/64.1; 210/702; 210/723; 210/728; 210/729; 210/730; 210/731; 210/732; 210/748

(58) Field of Classification Search .......... 71/21, 71/64.1, 702, 723, 728, 729, 730, 731, 732, 71/748

See application file for complete search history.

(56) References Cited

U.S. PATENT DOCUMENTS

| | | | | |
|---|---|---|---|---|
| 4,219,417 A | * | 8/1980 | Ramirez | 210/707 |
| 6,800,206 B2 | * | 10/2004 | Robinson | 210/746 |
| 6,902,678 B2 | * | 6/2005 | Tipton | 210/748 |
| 6,946,080 B2 | * | 9/2005 | Perkins et al. | 210/754 |
| 6,960,301 B2 | * | 11/2005 | Bradley | 210/663 |
| 7,087,176 B2 | * | 8/2006 | Gavrel et al. | 210/748 |
| 7,258,800 B1 | * | 8/2007 | Herbst | 210/703 |

* cited by examiner

*Primary Examiner*—Wayne Langel
(74) *Attorney, Agent, or Firm*—AKC Patents LLC; Aliki K. Collins

(57) ABSTRACT

An improved system for processing a liquid manure and producing organic fertilizer includes equipment for separating various components of the liquid manure having different nitrogen to phosphorous ratios and then mixing these components so as to produce an organic fertilizer with a predetermined nitrogen to phosphorus ratio. The system includes equipment for separating a first manure component that contains about 15 percent soluble phosphorus and about 20 percent soluble nitrogen, equipment for adding a flocculant material to the liquid manure aqueous solution, equipment for separating a second manure component that contains about 40 percent partially soluble phosphorus and about 30 percent partially soluble nitrogen, equipment for performing direct current electrocoagulation cleaning of the liquid manure aqueous solution and separating a third manure component that contains about 45 non-soluble phosphorus and about 10 percent non-soluble nitrogen and equipment for performing clarifying cleaning of the liquid manure aqueous solution and separating a fourth manure component that contains about 40 percent non-soluble nitrogen and no phosphorous.

21 Claims, 4 Drawing Sheets

APPARATUS AND METHOD FOR MANURE RECLAMATION

FIELD OF THE INVENTION

The present invention relates to an apparatus and a method for manure reclamation, and more particularly to manure reclamation that integrates a manure treatment system, and a custom fertilizer production system.

BACKGROUND OF THE INVENTION

In the northern parts of the United States, dairy cattle are confined in dairy farms and fed with phosphate-rich feed during the long winter periods. During this long period of confinement, that lasts from the early fall until the early spring, the "in barn" produced manure accumulates in the farm. Similarly, poultry-based farms produce different but sometimes more concentrated manure. The concentrated manure from the dairy farms, the poultry farms or any other type of animal farms is usually stored outside of the barn in a manure pit and then spread over the fields in the spring. Government agencies have recommended this practice of spreading of manure over fields during spring as a method of disposing of agricultural waste while fertilizing the ground. This practice has led to purchase, maintenance and paying of taxes on land that is kept primarily for manure overspread, which is a major financial burden for the farmers.

Manure is composed of 96% water and of 4% solid nutrient materials. In other words, unprocessed manure is a very dilute source of fertilizing nutrients. Furthermore, studies have shown that phosphorous and other nutrients present in manure are water soluble, which causes these nutrients to be washed out by rain or snow. Therefore one ton of manure yields only 7 to 10 pounds of nutrients to the ground.

Spreading of manure is not allowed during the winter months on top of snow to prevent runoff of phosphates and other contaminants to nearby rivers, lakes and other groundwater systems with the melting of the snow. However, the process of spreading of the concentrated manure in the spring still causes excess runoff of phosphates and other contaminants to nearby rivers, lakes and other groundwater systems. Agricultural runoff, rich in nutrients like phosphorus and nitrogen has been linked to toxic microorganisms. These microorganisms are known to kill and/or cause diseases in fish and other animals and pose a serious health risk to humans.

Typical dairy manure contains nitrogen (N) and phosphorous (P) at a ratio of 3 to 1. The optimum fertilizer ratio of N:P for growing corn is 8 to 1. Therefore, the farmer has to spread in addition to the manure a large amount of urea for adding nitrogen in order to generate the required 8 to 1 ratio of N:P in the ground. Other plants require different ratios of N:P and the amount and type of additives need to be modified accordingly. This process of adding and spreading urea or other additives increases both the labor and material cost of farming and requires that the farmer goes out in the fields several times during the year.

As was mentioned above, phosphorus is water soluble which leads to phosphorus being washed out from the manure pit and soil by rain and carried to rivers, lakes and other groundwater systems, thereby causing pollution and reducing the fertilizing value of the manure. Also, nitrogen evaporates from the manure pit as ammonia which generates undesirable odors and causes the concentration of insects and vermin, while again reducing the fertilizing value of the manure.

Several prior art methods have been suggested for treating manure on the barn site and for converting manure to fertilizer. However, most of the prior art methods are not efficient, not scalable, or not economical and may require the addition of other chemicals for producing fertilizer.

Accordingly, there is a need for an efficient, scalable, economically viable and environmentally friendly process for treating manure and for producing stable custom fertilizer without the need to add chemicals.

SUMMARY OF THE INVENTION

In general, in one aspect, the invention features a method for processing liquid manure that includes transferring the liquid manure among a plurality of processing stations in a predetermined sequence starting at an input station and ending at an output station. The method includes separating a first manure component and a first overflow liquor from the liquid manure at a first processing station via a first mechanical separation equipment. Next, adding a flocculant material to the first overflow liquor at at least one of the processing stations and then separating a second manure component and a second overflow liquor from the first overflow liquor at a second processing station via a second mechanical separation equipment. Next, performing direct current electrocoagulation cleaning of the second overflow liquor at a third processing station and separating a third manure component and a third overflow liquor and finally performing clarifying cleaning of the third overflow liquor at the output station and separating a fourth manure component and water.

Implementations of this aspect of the invention may include one or more of the following features. The liquid manure may be homogenized at the input station and the water may be discharged from the output station. The flocculant material may be a complex carbohydrate compound. The complex carbohydrate compound may be Fycosyllactose ($C_{18}H_{32}O_{15}$), Difucosyllactose ($C_{24}H_{42})_{19}$), Lacto-N-tetraose ($C_{26}H_{45}NO_{21}$), Lacto-N-fucopentaose I ($C_{32}H_{55}NO_{25}$), Lacto-N-difucohexaose I($C_{38}H_{65}NO_{29}$), Lacto-N-fucopentaose III, Monofucosyllacto-N-hexaose ($C_{46}H_{78}N_2O_{35}$), Difucosyllacto-N-hexaose (a) ($C_{52}H_{88}N_2O_{39}$), Difucosyllacto-N-neohexaose, Difucosyl-para-lacto-N-hexaose, Trifucosyllacto-N-hexaose ($C_{58}H_{98}N_2O_{43}$), Trifucosyl-para-lacto-N-hexaose, Sialyllactose ($C_{23}H_{39}NO_{19}$), Sialyllacto-N-tetraose ($C_{37}H_{62}N_{15}O_{29}$), Monofucosyl, monosialyllactose ($C_{29}H_{49}NO_{23}$), Monosialyl, monofucosyllacto-N-neotetraose ($C_{43}H_{72}N_2O_{33}$), Disialyllactose-N-tetraose ($C_{48}H_{79}N_3O_{37}$), A-pentasaccharide ($C_{32}H_{55}NO_{24}$), B-pentasaccharide ($C_{30}H_{52}O_{24}$), Oligomannose-3 ($C_{35}H_{58}N_2O_{26}$), Oligomannose-5 ($C_{46}H_{78}N_2O_{36}$), Oligomannose-6 ($C_{52}H_{88}N_2O_{41}$), Oligomannose-7D1 ($C_{58}H_{98}N_2O_{46}$), Oligomannose-7D2, Oligomannose-7D3, Oligomannose-8D1D3, Oligomannose-8D1D2 ($C_{64}H_{108}N_2O_{51}$), Oligomannose-8D2D3, Oligomannose-9 ($C_{70}H_{118}N_2O_{56}$), Asialo-biantennary ($C_{62}H_{104}N_4O_{46}$), Asialo-biantennary with core substituted fucose ($C_{68}H_{114}N_4O_{50}$), Disialyl-biantennary ($C_{84}H_{138}N_6O_{62}$), Oligomannose-3 substituted with fucose and xylose ($C_{45}H_{76}N_2O_{34}$), Oligomannose2(a) ($C_{28}H_{48}N_2O_{21}$, Oligomannose-4 ($C_{40}H_{68}N_2O_{31}$), Lacto-N-hexaose, Lacto-N-neohexaose, Monosialyl LNnH, Monosialyl monofucosyl LnnH, Disialyl monofucosyl LNH, Chitobiose, or Maltotriose. The first mechanical separation equipment may be a screw press and the second mechanical separation equipment may be a plate filter press. The flocculant may be lime, iron, aluminum, wollostonite, calcium, starches, proteins, gelatin, animal glue, polymeric compounds or food grade polymers. The liquid manure may also pass through a pre-thickener station. The first manure component may have about 15 percent soluble phosphorus and about 20 percent soluble nitrogen. The second manure component may have about 40 percent partially soluble phosphorus and about 30 percent partially soluble nitrogen. The third manure component may have about 45 non-soluble phosphorus and about 10 percent non-soluble nitrogen. The fourth manure component may have about 40 percent non-soluble nitrogen and no phosphorous. Any of the manure components may be stabilized by adding a stabilizing component, such as lime, wollostonite, calcium carbonate, complex carbohydrates, or calcium. The method may further include mixing a first amount of the first manure component, a second amount of the second manure component, a third amount of the third manure component and/or a fourth amount of the fourth manure component to obtain a fertilizer comprising a desired nitrogen to phosphorous ratio. Any of the first, second, third or fourth amounts may be in the range of 0 to 100 percent with the sum thereof being 100 percent. Equal amounts of the third manure component and the fourth manure component may be mixed to obtain a fertilizer with a nitrogen to phosphorous ratio of 7:1. Equal amounts of the first manure component and the fourth manure component may be mixed to obtain a fertilizer with a nitrogen to phosphorous ratio of 30:1.

In general, in another aspect, the invention features a method for processing liquid manure and producing an organic fertilizer with a predetermined nitrogen to phosphorus that includes transferring the liquid manure among a plurality of processing stations in a predetermined sequence starting at an input station and ending at an output station. The method includes separating a first manure component and a first overflow liquor from the liquid manure at a first processing station via a first mechanical separation equipment. Next, adding a flocculant material to the first overflow liquor at at least one of the processing stations and then separating a second manure component and a second overflow liquor from the first overflow liquor at a second processing station via a second mechanical separation equipment. Next, performing direct current electrocoagulation cleaning of the second overflow liquor at a third processing station and separating a third manure component and a third overflow liquor. Next, performing clarifying cleaning of the third overflow liquor at the output station and separating a fourth manure component and water and finally mixing a first amount of the first manure component, a second amount of the second manure component, a third amount of the third manure component and/or a fourth amount of the fourth manure component to obtain a fertilizer comprising the predetermined nitrogen to phosphorous ratio.

In general, in another aspect, the invention features a system for processing liquid manure that includes equipment for transferring the liquid manure among a plurality of processing stations in a predetermined sequence starting at an input station and ending at an output station. The system includes equipment for separating a first manure component and a first overflow liquor from the liquid manure at a first processing station, equipment for adding a flocculent material to the first overflow liquor at at least one of the processing stations, and equipment for separating a second manure component and a second overflow liquor from the first overflow liquor at a second processing station. The system also includes equipment for performing direct current electrocoagulation cleaning of the second overflow liquor at a third processing station and separating a third manure component and a third overflow liquor and equipment for performing clarifying cleaning of the third overflow liquor at the output station and separating a fourth manure component and water. The system may also include equipment for mixing a first amount of the first manure component, a second amount of the second manure component, a third amount of the third manure component and/or a fourth amount of the fourth manure component to obtain a fertilizer comprising a predetermined nitrogen to phosphorous ratio.

In general, in another aspect, the invention features a method for processing milk house waste (MHW) and foot bath waste (FBW). The MHW and FBW comprise metal compounds and short chain carbon compounds. The method includes first collecting the MHW and FBW and then performing direct current electrocoagulation cleaning of the MHW and FBW. Electrocoagulation separates inactive oxides of the metal compounds, the short chain carbon compounds and an overflow liquor. The method finally includes performing clarifying cleaning of the overflow liquor and separating a solid component and water. The metal compounds comprise zinc sulfate or copper sulfate and the inactive oxides of the metal compounds comprise zinc oxide or copper oxide, respectively.

Among the advantages of this invention may be one or more of the following. The method eliminates the cost associated with spreading of manure which may amount to over fifty thousand dollars per year for each farmer. The method also eliminates the need to purchase, maintain and pay taxes for land used primarily for manure overspread. The method provides the farmer the capability to produce either on the barn-site or outside the barn customized fertilizer. The customized fertilizer is designed to have a ratio of nitrogen to phosphorous that is appropriate for a particular soil type and for a particular crop type. This customized fertilizer is produced by mixing various manure components and is stabilized so that the contained nutrients do not wash away or evaporate. The method does not require adding any additional nutrients or compacting or drying of the manure components. The mixture of the manure components is stabilized and delivered to the farm in wet form. The custom fertilizer production method eliminates the yearly fertilizer expense which could be over seventy thousand dollars per farm. The water that comes out of the manure treatment process meets the Environmental Protection Agency's (EPA) standards for surface discharge and can be used for field irrigation purposes. The method eliminates any bacteria, microbia, viruses, cysts and insects from the manure and the surface discharged water. The method is scalable, low cost, efficient and environmentally friendly.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

Referring to the figures, wherein like numerals represent like parts throughout the several views.

DETAILED DESCRIPTION OF THE INVENTION

The invention features an improved system and method for processing liquid manure and producing organic fertilizer. The system includes equipment for separating various components of the liquid manure having different nitrogen to phosphorous ratios and then mixing these components so as to produce an organic fertilizer with a predetermined nitrogen to phosphorus ratio.

Figure 1:
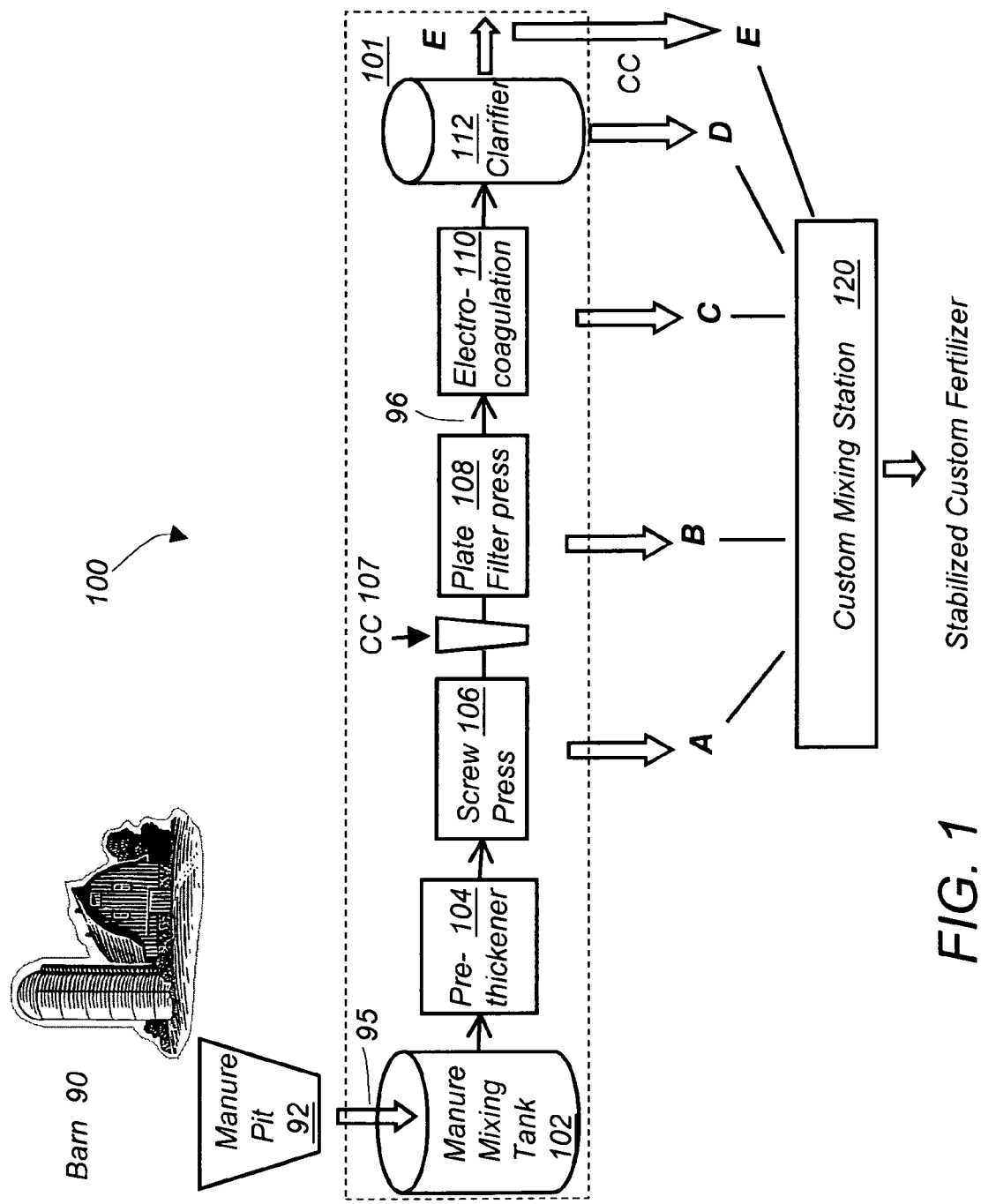
FIG. 1 is a diagrammatic view of the manure reclamation system of this invention.

Referring to FIG. 1, a manure reclamation system 100 includes a manure treatment system 101 and a fertilizer production system 120. Manure 95 that accumulates in a manure pit 92 on the barn site 90 enters into a manure mixing tank 102. The manure 95 at this stage is in liquid form and is composed of about 92% to 96% water and 4% to 8% solids. The solids include, in addition to the dissolved manure, animal byproducts, such as pieces of tail, cow ears, nails, bedding, placenta, hair, grains, sand and other small particles. Several nutrients are dissolved in the water including phosphorus (P), nitrogen (N) and potassium (K), among others. The manure treatment process 101 includes separation of liquids from solids, collection of the separated solid materials at the various stages and treatment of the remaining liquid so that it can be discharged back into the fields. In the mixing tank 102 the big undissolved solid pieces are removed from the liquid manure and the remaining mixture is stirred in order to form a homogenous mixture. The liquid manure 95 leaves the mixing tank 102 and enters a pre-thickener station 104. The pre-thickener station 104 includes a stainless steel screen that strains and removes the excess water out. Next, the manure 95 passes through a screw press station 106. The screw press 106 separates the sludge component A from the manure. The sludge component A contains the best quality of manure, also called "cake". The "cake" contains about 15% soluble P and 20% soluble N and it can be directly injected into the ground for fertilizing purposes. The "cake" is excellent for aerating clay type soils and the process of injecting the "cake" introduces the nutrients deep into the soil at about 4 to 8 inches depth from the surface.

Next, the remaining liquid manure solution is emptied into a container 107 and a flocculant component is added. The flocculant component is usually a mixture of inorganic and organic compounds. Inorganic flocculant compounds include iron, aluminum and minerals such as lime and wollostonite. Organic flocculant compounds include starches, proteins, gelatin, animal glue, polymeric compounds, and food grade polymers. A class of organic flocculant compounds that has been found to be especially efficient are complex carbohydrates (CC). Examples of complex carbohydrates include Fycosyllactose ($C_{18}H_{32}O_{15}$), Difucosyllactose ($C_{24}H_{42})_{19}$), Lacto-N-tetraose ($C_{26}H_{45}NO_{21}$), Lacto-N-fucopentaose I ($C_{32}H_{55}NO_{25}$), Lacto-N-difucohexaose I($C_{38}H_{65}NO_{29}$), Lacto-N-fucopentaose III, Monofucosyllacto-N-hexaose ($C_{46}H_{78}N_2O_{35}$), Difucosyllacto-N-hexaose (a) ($C_{52}H_{88}N_2O_{39}$), Difucosyllacto-N-neohexaose, Difucosyl-para-lacto-N-hexaose, Trifucosyllacto-N-hexaose ($C_{58}H_{98}N_2O_{43}$), Trifucosyl-para-lacto-N-hexaose, Sialyllactose ($C_{23}H_{39}NO_{19}$), Sialyllacto-N-tetraose ($C_{37}H_{62}N_{15}O_{29}$), Monofucosyl, monosialyllactose ($C_{29}H_{49}NO_{23}$), Monosialyl, monofucosyllacto-N-neotetraose ($C_{43}H_{72}N_2O_{33}$), Disialyllactose-N-tetraose ($C_{48}H_{79}N_3O_{37}$), A-pentasaccharide ($C_{32}H_{55}NO_{24}$), B-pentasaccharide ($C_{30}H_{52}O_{24}$), Oligomannose-3 ($C_{35}H_{58}N_2O_{26}$), Oligomannose-5 ($C_{46}H_{78}N_2O_{36}$), Oligomannose-6 ($C_{52}H_{88}N_2O_{41}$), Oligomannose-7D1 ($C_{58}H_{98}N_2O_{46}$), Oligomannose-7D2, Oligomannose-7D3, Oligomannose-8D1D3, Oligomannose-8D1D2 ($C_{64}H_{108}N_2O_{51}$), Oligomannose-8D2D3, Oligomannose-9 ($C_{70}H_{118}N_2O_{56}$), Asialo-biantennary ($C_{62}H_{104}N_4O_{46}$), Asialo-biantennary with core substituted fucose ($C_{68}H_{114}N_4O_{50}$), Disialyl-biantennary ($C_{84}H_{138}N_6O_{62}$), Oligomannose-3 substituted with fucose and xylose ($C_{45}H_{76}N_2O_{34}$), Oligomannose2(a) ($C_{28}H_{48}N_2O_{21}$, Oligomannose-4 ($C_{40}H_{68}N_2O_{31}$), Lacto-N-hexaose, Lacto-N-neohexaose, Monosialyl LNnH, Monosialyl monofucosyl LnnH, Disialyl monofucosyl LNH, Chitobiose, and Maltotriose. These complex carbohydrates are produced by GlycoTech, Gaithersburg, Md. 20879. Typical amounts of flocculants used are 1 gram per liter of manure. In addition to their role as flocculants, the complex carbohydrates contribute to electrically stabilizing the irrigation water so that Nitrogen remains in the solution and does not evaporate. Furthermore, complex carbohydrates form enzymes that further stabilize the soil from further leaching.

After the addition of the flocculant component the manure solution passes through a plate filter press 108. The plate filter press 108 separates and removes sludge B from the liquid manure 95 and the remaining overflow liquor 96 goes into an electrocoagulation station 110. In station 108 all silt and other fine particle materials are also removed. Sludge component B contains about 40% partially soluble P, and about 30% partially soluble N. Additives, such as calcium carbonate, CC, lime, food grade polymers, or wollostonite are added to the sludge component B in order to stabilize the water soluble P and the volatile N and to form a short time release fertilizer.

The electrocoagulation station 110 includes at least two metal plate electrodes (an anode and a cathode) that are connected to a DC current electrical source. The two most common plate materials are iron and aluminum. In accordance with Faraday's law, metal ions are split off or sacrificed into the liquid medium. These metal ions tend to form metal oxides that electromechanically attract to the various water contaminants. The electrocoagulation process destabilizes the suspended, emulsified or dissolved contaminants, attaches them to the metal ions and metal oxides and then carries them to the plate with the opposite charge. Generally, this state of stability produces a solid that is either less colloidal and less emulsified (or soluble) than the compound at equilibrium values. As this occurs, the contaminants form hydrophobic entities that precipitate and can easily be removed by a number of secondary separation techniques. Electrocoagulation removes all remaining phosphorous while leaving behind as much nitrogen as possible. Electrocoagulation also removes heavy metals, oxides, suspended colloidal solids, fats, oils, grease, and complex organic materials. Electrocoagulation also breaks oil emulsions and destroys and removes bacteria, viruses, cyst, microbia and other pathogenic microorganism.

The extracted sludge C is not soluble and contains about 45% P and 10% N. Finally the remaining liquid passes through an atmospheric clarifying station 112, where the remaining insoluble components are separated from the water E. Water solution D contains 40% of insoluble N and no P. The nitrogen rich water solution D is further stabilized by adding CC and converting it into nitrate. Water E is free of any phosphorus, meets EPA standards for phosphorous surface release and is used for irrigation and as a fertilizer base of the surrounding fields. Water E may be collected in a perc pond or used for inground infiltration.

Figure 2:
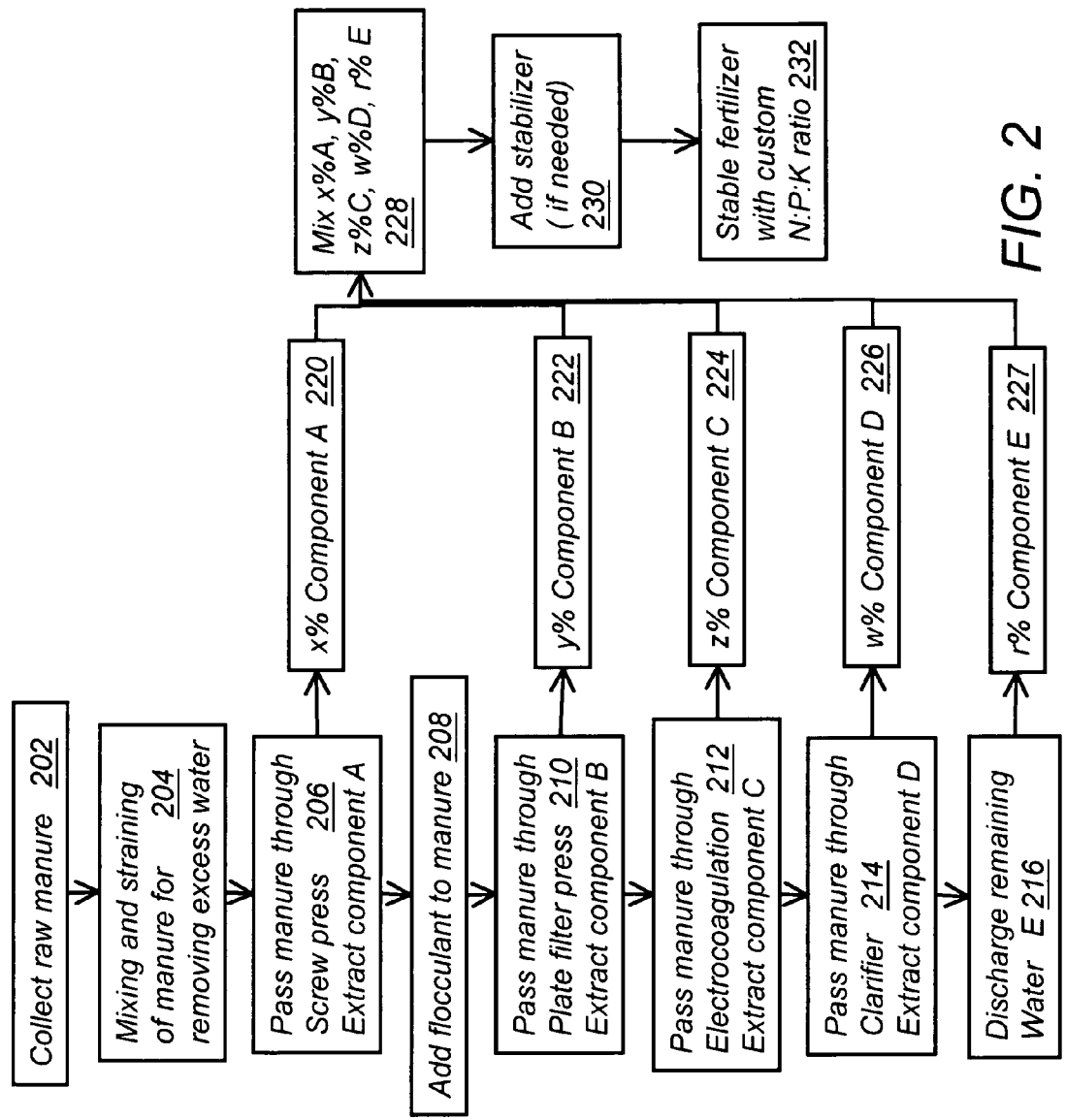
FIG. 2 is a block diagram of the manure reclamation process and the fertilizer production process.

As was mentioned, the fertilizer composition depends upon the composition of the soil and the type of plant that the farmer wants to grow on the particular soil. For example, for clay-type soil, a fertilizer composed of component A is suitable. For sandy type of soil a fertilizer composed of component B is suitable. At the same time, in order to grow corn the N:P ratio needs to be converted to 8:1. The process 200 of producing fertilizer with custom N:P ratio and composition is described with reference to FIG. 2. The raw manure is collected in a manure pit (202) and then is introduced into a mixing tank where it is stirred to produce a homogenized mixture and then strained to remove excess water (204). Next the manure passes through a screw press, where component A is extracted (206). In the next step a flocculent is added to the manure (208) and then it passes through a plate filter press where component B is extracted (210). The remaining solution passes through an electrocoagulation station where component C is extracted (212) and then through s clarifier where component D is extracted (214). Finally the remaining water E is clean enough and is discharged to the fields for irrigation purposes (216). A percentage x from component A (220), a percentage y from component B (222), a percentage z from component C (224), a percentage w from component D (226) and a percentage r from component E are mixed to produce a fertilizer with custom composition and N:P ratio (228). If necessary, an additional stabilizing material, such as CC or lime, is added to form a stable time-release fertilizer.

In one example, component C that contains 45% P(400 mg/L) and 10% N (560 mg/L) is mixed with component D that contains 0% P and 40% N (2240 mg/L) to produce a fertilizer with a N:P ratio of 7:1 (2800 mg/L of N and 400 mg/L of P). In another example, component A that contains 20% N (1120 mg/L) and 15% P (130 mg/L) is mixed with component D that contains 40% N (2240 mg/L) and 0% P to produce a fertilizer with a N:P ratio of 30:1 (3370 mg/L of N and 130 mg/L of P). Similarly any type of N:P ratio is generated by mixing the appropriate component A, B, C, or D at the appropriate percentages.

Table 1 summarizes the N and P content of component A, B, C and D extracted from the screw press, plate filter press, electrocoagulation station, and clarifier, respectively.

TABLE 1

|  | N (mg/L) | P (mg/L) | Solubility |
| --- | --- | --- | --- |
| Component A | 1120 | 130 | Soluble |
| Component B | 1700 | 360 | Partially soluble |
| Component C | 560 | 400 | Non-soluble |
| Component D | 2240 | 0 | Non-soluble |

By varying the amount of added flocculants the amount of N and P content of components A, B, C, D and E may be varied between minus 5% or 7% to plus 5% or 7%.

Figure 3:
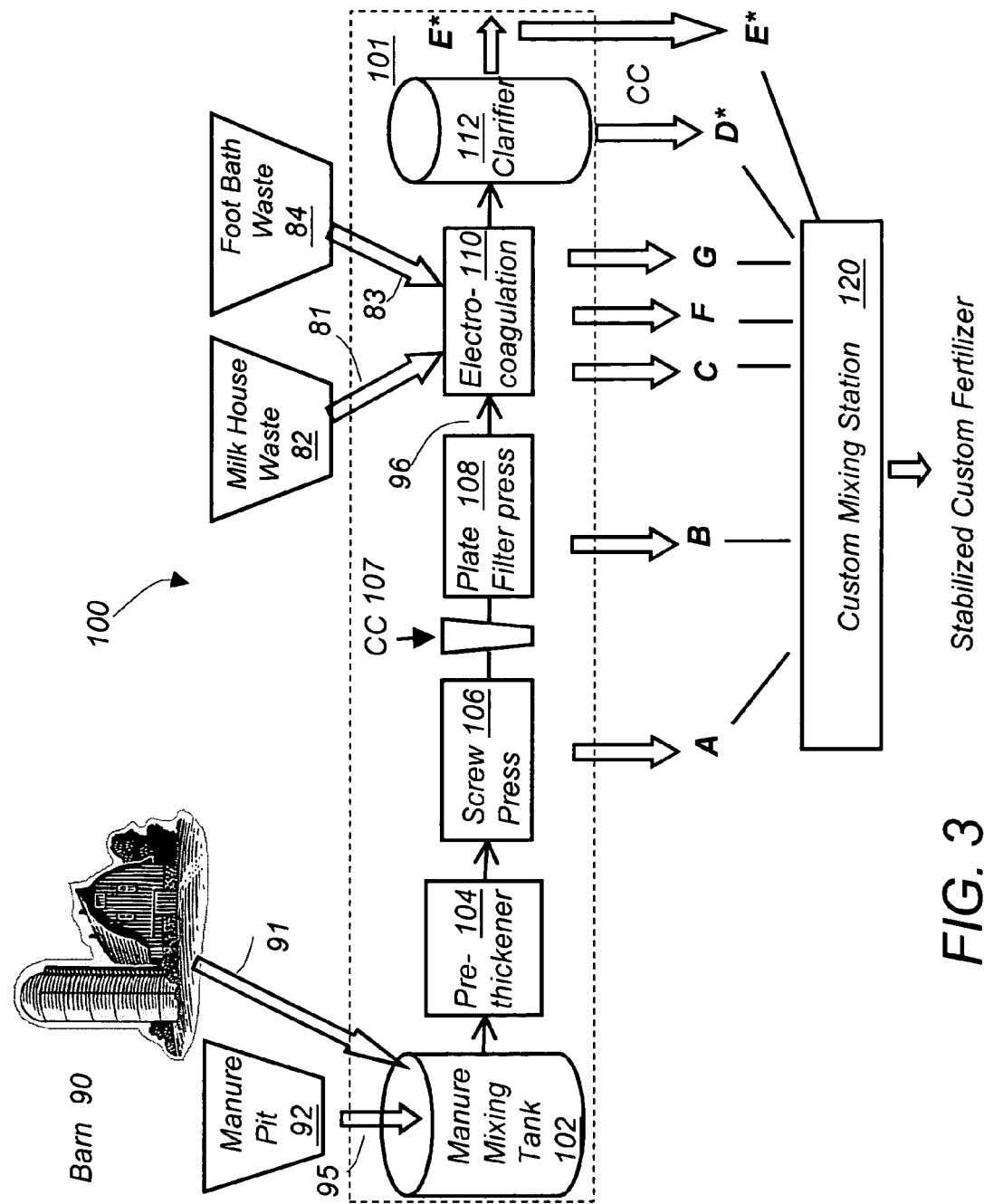
FIG. 3 is another embodiment of the manure reclamation system including processing of the Milk House Waste (MHW) and Foot Bath Waste (FBW)

In addition to manure reclamation the present system is used to reclaim other barn waste products including milk house waste (MHW) and foot bath waste (FBW). Cows are usually sprayed with or walk through foot bath solutions that contain zinc sulfate, or copper sulfate or formaldehyde. This weekly treatment prevents the formation of hairy warts in their feet. The chemicals used in the foot bath solutions can cause heavy metal contamination of the nearby lagoons and fields, if there are not removed before surface discharge. Currently, the MHW and FBW are placed directly in the manure pit, which makes it difficult to separate and remove them. A new method of separating and removing the chemicals used in the foot baths includes collecting the MHW and FBW separately and then passing them through the electrocoagulation station. Referring to FIG. 3, the milk house waste 81 and the foot bath waste 83 are collected in containers 82 and 84, respectively. The process of reclaiming metals and other nutrients from the milk house waste and the foot bath waste is described with reference to FIG. 4. The collected milk house waste 81 (302) and the collected foot bath waste 83 (304) are introduced into the electrocoagulation station 110. The electrocoagulation cleaning process separates components F and G (312) form the MHW and FBW, respectively. Components F and G include inactive oxides and short chain carbon compounds such as, methanol, ethanol, and formaldehyde. The electrocoagulation treatment converts copper sulfate and zinc sulfate into copper oxide and zinc oxide, respectively. The inactive copper oxide and zinc oxide and the short chain carbon compounds precipitate out as components F and G. The remaining liquid passes through the clarifier 112 (314). Clarifier 112 extracts component D* from the liquid and discharges the remaining water E* to the fields for irrigation purposes or to perc ponds or for inground infiltration (316).

Figure 4:
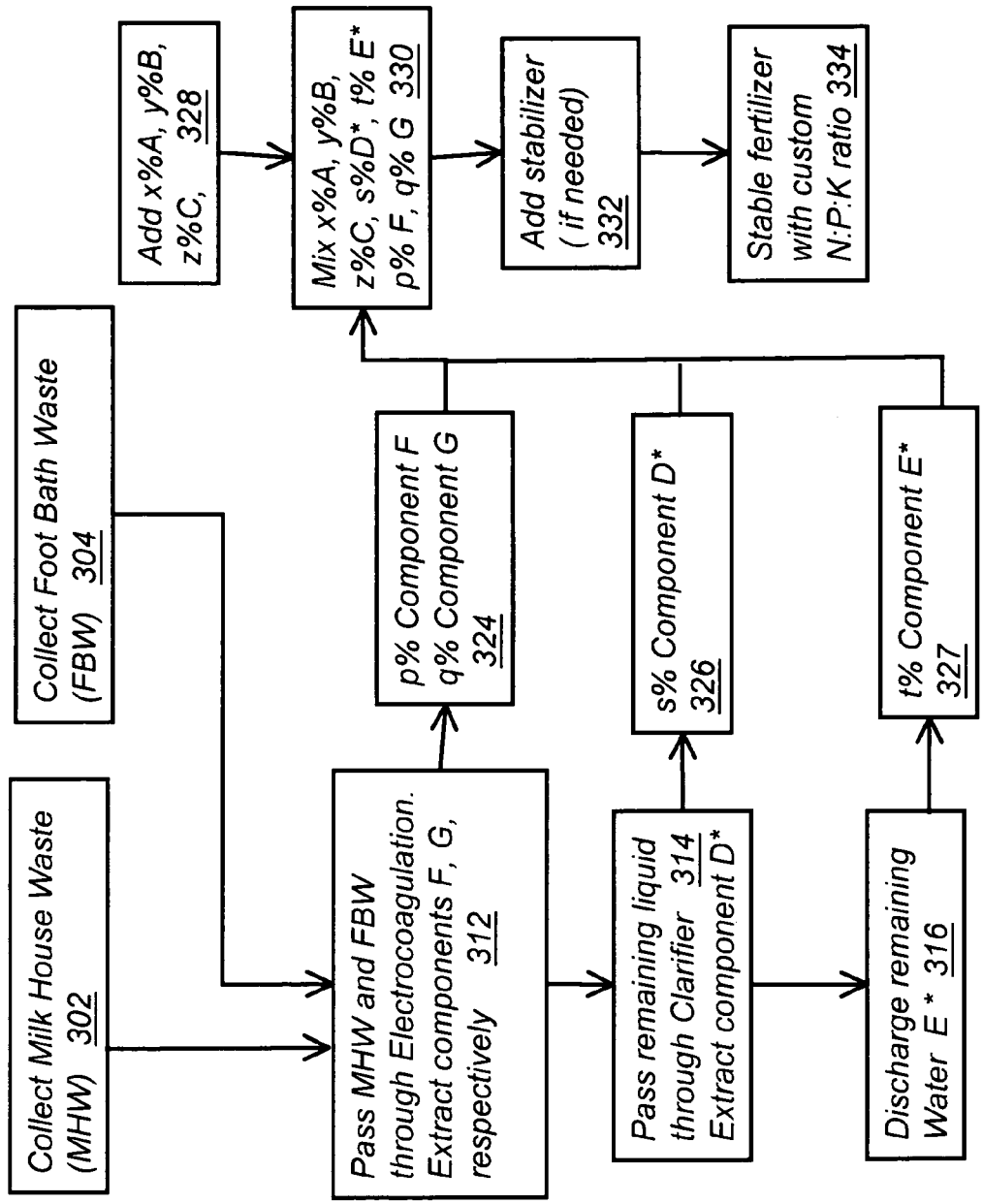
FIG. 4 is a block diagram of the manure reclamation process and the fertilizer production process based on the embodiment of FIG. 3.

Components F, G, D* and E* are also used in the production of a custom fertilizer. Referring to FIG. 4, a percentage p from component F and a percentage q from component G (324), a percentage s from component D* (326), and a percentage t from component E* (327) are mixed with a percentage x of component A, a percentage y of component B, and a percentage z of component C to produce a fertilizer with custom composition and N:P:K ratio (334). If necessary, an additional stabilizing material, such as CC or lime, is added to form a stable time-release fertilizer (332).

Other embodiments are within the scope of the following claims. For example, manure may be from cattle, poultry, sheep, pig or any other animal. The flocculent may be added at any of the process stations including the mixing tank, the pre-thickener, the electrocoagulation or the clarifier. Manure 91 may be introduced into the manure mixing tank 102 directly from the barn 90, as shown in FIG. 3. The reclamation of the MHW and FBW may occur separate from the manure reclamation or in conjunction with the manure reclamation.

Several embodiments of the present invention have been described. Nevertheless, it will be understood that various modifications may be made without departing from the spirit and scope of the invention. Accordingly, other embodiments are within the scope of the following claims.

What is claimed is:

1. A method for processing liquid manure comprising:
    transferring said liquid manure into an input station;
    separating a first manure component and a first overflow liquor from said liquid manure at a first processing station via a first mechanical separation equipment;
    adding a flocculant material to said first overflow liquor at said first processing station;
    separating a second manure component and a second overflow liquor from said first overflow liquor at a second processing station via a second mechanical separation equipment;
    performing direct current electrocoagulation cleaning of said second overflow liquor at a third processing station and separating a third manure component and a third overflow liquor; and
    performing clarifying cleaning of said third overflow liquor at an output station and separating a fourth manure component and water.

2. The method of claim 1 further comprising homogenizing said liquid manure at said input station.

3. The method of claim 1 further comprising discharging said water from said output station.

4. The method of claim 1 wherein said flocculant material comprises a complex carbohydrate compound.

5. The method of claim 4 wherein said complex carbohydrate compound comprises one of Fycosyllactose ($C_{18}H_{32}O_{15}$), Difucosyllactose ($C_{24}H_{42})_{19}$), Lacto-N-tetraose ($C_{26}H_{45}NO_{21}$), Lacto-N-fucopentaose I($C_{32}H_{55}NO_{25}$), Lacto-N-difucohexaose I($C_{38}H_{65}NO_{29}$), Lacto-N-fucopentaose III, Monofucosyllacto-N-hexaose ($C_{46}H_{78}N_2O_{35}$), Difucosyllacto-N-hexaose (a) ($C_{52}H_{88}N_2O_{39}$), Difucosyllacto-N-neohexaose, Difucosyl-para-lacto-N-hexaose, Trifucosyllacto-N-hexaose ($C_{58}H_{98}N_2O_{43}$), Trifucosyl-para-lacto-N-hexaose, Sialyllactose ($C_{23}H_{39}NO_{19}$), Sialyllacto-N-tetraose ($C_{37}H_{62}N_{15}O_{29}$), Monofucosyl, monosialyllactose ($C_{29}H_{49}NO_{23}$), Monosialyl, monofucosyllacto-N-neotetraose ($C_{43}H_{72}N_2O_{33}$), Disialyllactose-N-tetraose ($C_{48}H_{79}N_3O_{37}$), A-pentasaccharide ($C_{32}H_{55}NO_{24}$), B-pentasaccharide ($C_{30}H_{52}O_{24}$), Oligomannose-3 ($C_{35}H_{58}N_2O_{26}$), Oligomannose-5 ($C_{46}H_{78}N_2O_{36}$), Oligomannose-6 ($C_{52}H_{88}N_2O_{41}$), Oligomannose-7D1 ($C_{58}H_{98}N_2O_{46}$), Oligomannose-7D2, Oligomannose-7D3, Oligomannose-8D1D3, Oligomannose-8D1D2 ($C_{64}H_{108}N_2O_{51}$), Oligomannose-8D2D3, Oligomannose-9 ($C_{70}H_{118}N_2O_{56}$), Asialo-biantennary ($C_{62}H_{104}N_4O_{46}$), Asialo-biantennary with core substituted fucose ($C_{68}H_{114}N_4O_{50}$), Disialyl-biantennary ($C_{84}H_{138}N_6O_{62}$), Oligomannose-3 substituted with fucose and xylose ($C_{45}H_{76}N_2O_{34}$), Oligomannose2(a) ($C_{28}H_{48}N_2O_{21}$), Oligomannose-4 ($C_{40}H_{68}N_2O_{31}$), Lacto-N-hexaose, Lacto-N-neohexaose, Monosialyl LNnH, Monosialyl monofucosyl LnnH, Disialyl monofucosyl LNH, Chitobiose, or Maltotriose.

6. The method of claim 1 wherein said first mechanical separation equipment comprises a screw press.

7. The method of claim 1 wherein said second mechanical separation equipment comprises a plate filter press.

8. The method of claim 1 where said flocculant material comprises one of lime, iron, aluminum, wollostonite, calcium, starches, proteins, gelatin, animal glue, polymeric compounds or food grade polymers.

9. The method of claim 1 further comprising passing said liquid manure through a pre-thickener station.

10. The method of claim 1 wherein said first manure component comprises about 15 percent soluble phosphorus and about 20 percent soluble nitrogen.

11. The method of claim 1 wherein said second manure component comprises about 40 percent partially soluble phosphorus and about 30 percent partially soluble nitrogen.

12. The method of claim 1 wherein said third manure component comprises about 45 percent non-soluble phosphorus and about 10 percent non-soluble nitrogen.

13. The method of claim 1 wherein said fourth manure component comprises about 40 percent non-soluble nitrogen and no phosphorous.

14. The method of claim 1 further comprising stabilizing any of said manure components by adding a stabilizing component.

15. The method of claim 14 wherein said stabilizing component comprises one of lime, wollostonite, calcium carbonate, complex carbohydrates, or calcium.

16. The method of claim 1 further comprising mixing a first amount of said first manure component, a second amount of said second manure component, a third amount of said third manure component and/or a fourth amount of said fourth manure component to obtain a fertilizer comprising a desired nitrogen to phosphorous ratio.

17. The method of claim 16 wherein any of said first, second, third or fourth amounts is in the range of 0 to 100 percent and the sum thereof being 100 percent.

18. The method of claim 16 wherein said third manure component comprises about 45 percent non-soluble phosphorus and about 10 percent non-soluble nitrogen and said fourth manure component comprises about 40 percent non-soluble nitrogen and no phosphorous and wherein equal amounts of said third manure component and said fourth manure component are mixed to obtain a fertilizer with a nitrogen to phosphorous ratio of 7:1.

19. The method of claim 16 wherein said first manure component comprises about 15 percent soluble phosphorus and about 20 percent soluble nitrogen and said fourth manure component comprises about 40 percent non-soluble nitrogen and no phosphorous and wherein equal amounts of said first manure component and said fourth manure component are mixed to obtain a fertilizer with a nitrogen to phosphorous ratio of 30:1.

20. A method for processing milk house waste (MHW) and foot bath waste (FBW) comprising:
    collecting said MHW and FBW, wherein said MHW and FBW comprise metal compounds and short chain carbon compounds;
    performing direct current electrocoagulation cleaning of said MHW and FBW, thereby separating inactive oxides of said metal compounds, said short chain carbon compounds and an overflow liquor; and
    performing clarifying cleaning of said overflow liquor and separating a solid component and water.

21. The method of claim 20 wherein said metal compounds comprise zinc sulfate or copper sulfate and said inactive oxides of said metal compounds comprise zinc oxide or copper oxide, respectively.

* * * * *